(12) United States Patent
Herrli et al.

(10) Patent No.: US 12,106,567 B2
(45) Date of Patent: Oct. 1, 2024

(54) METHOD AND ARRANGEMENT FOR DETERMINING A GROUP OF PERSONS TO BE CONSIDERED

(71) Applicant: XOVIS AG, Zollikofen (CH)

(72) Inventors: Markus Herrli, Allmendingen (CH); Benjamin Raphael Miesch, Zürich (CH)

(73) Assignee: XOVIS AG, Zollikofen (CH)

( * ) Notice: Subject to any disclaimer, the term of this patent is extended or adjusted under 35 U.S.C. 154(b) by 656 days.

(21) Appl. No.: 17/293,121

(22) PCT Filed: Dec. 14, 2018

(86) PCT No.: PCT/EP2018/085011
§ 371 (c)(1),
(2) Date: May 12, 2021

(87) PCT Pub. No.: WO2020/119924
PCT Pub. Date: Jun. 18, 2020

(65) Prior Publication Data
US 2022/0012501 A1    Jan. 13, 2022

(51) Int. Cl.
*G06V 20/52*  (2022.01)
*G06V 10/88*  (2022.01)
*G06V 40/10*  (2022.01)

(52) U.S. Cl.
CPC .............. *G06V 20/52* (2022.01); *G06V 10/88* (2022.01); *G06V 40/10* (2022.01)

(58) Field of Classification Search
CPC ...... G06V 20/52; G06V 40/172; G06V 10/10; G06V 40/161; G06T 2207/30196; G06T 7/00; G06T 2207/30232; G06K 19/06009
See application file for complete search history.

(56) References Cited

U.S. PATENT DOCUMENTS 9,760,852 B2   9/2017  Hasan
2003/0002712 A1*  1/2003  Steenburgh ............. G06T 7/285
382/103

(Continued)

FOREIGN PATENT DOCUMENTS

WO    WO2013/043590 A1    3/2013

*Primary Examiner* — Guillermo M Rivera-Martinez
(74) *Attorney, Agent, or Firm* — Birch, Stewart, Kolasch & Birch, LLP (57) ABSTRACT

The invention relates to a method and an arrangement for determining a group of persons to be considered staying in an observation region by considering exception markings for other persons, wherein the group of persons to be considered is a group of the persons staying in the observation region excluding the other persons who stay in the observation region and carry one of the exception markings. Thereby, the exception markings are graphic pattern with at least one characteristic length ratio. At least one image is recorded of the observation region, and in the at least one image, the persons staying in the observation region and optical signatures of the exception markings are detected, wherein the detected optical signatures are assigned to detected persons. Furthermore, a detected group of the detected persons to be considered in the observation region is determined excluding the detected persons with assigned detected optical signature.

18 Claims, 3 Drawing Sheets

(56) References Cited

U.S. PATENT DOCUMENTS

| | | | | |
|---|---|---|---|---|
| 2003/0215134 | A1* | 11/2003 | Krumm | G06T 7/70 |
| | | | | 382/170 |
| 2010/0239118 | A1* | 9/2010 | Behm | H04N 1/32309 |
| | | | | 382/167 |
| 2011/0169917 | A1* | 7/2011 | Stephen | G06V 40/103 |
| | | | | 348/46 |
| 2011/0220716 | A1* | 9/2011 | Schroeter | G07C 9/22 |
| | | | | 235/492 |
| 2012/0274777 | A1* | 11/2012 | Saptharishi | H04N 7/181 |
| | | | | 382/103 |
| 2012/0287266 | A1* | 11/2012 | Varekamp | G06T 7/70 |
| | | | | 348/135 |
| 2013/0101165 | A1* | 4/2013 | Rexilius | G06V 40/10 |
| | | | | 382/103 |
| 2013/0336531 | A1* | 12/2013 | Bobbitt | G06V 40/20 |
| | | | | 382/103 |
| 2014/0226855 | A1* | 8/2014 | Savvides | H04W 4/021 |
| | | | | 382/103 |
| 2015/0324647 | A1* | 11/2015 | Wuethrich | G06T 5/40 |
| | | | | 382/103 |
| 2018/0089493 | A1* | 3/2018 | Nirenberg | H04N 19/85 |
| 2018/0107880 | A1* | 4/2018 | Danielsson | G08B 13/194 |
| 2018/0349710 | A1* | 12/2018 | Houri | G06V 20/53 |

* cited by examiner

METHOD AND ARRANGEMENT FOR DETERMINING A GROUP OF PERSONS TO BE CONSIDERED

TECHNICAL FIELD

The invention relates to a method and an arrangement for determining a group of persons to be considered staying in an observation region by considering exception markings for other persons, wherein the group of persons to be considered is a group of the persons staying in the observation region excluding the other persons who stay in the observation region and carry one of the exception markings.

BACKGROUND ART

Methods and arrangements pertaining to the technical field initially mentioned are known. One example is described in WO 2013/043590 A1 of Shoppertrak RCT Corporation which relates to the field of human detection, tracking and counting, where a separate tracking and counting of employees and customers is enabled. It describes a method and an arrangement for detecting, tracking and counting of persons of interest entering or exiting an entrance or entrances of a facility. The arrangement includes at least one sensor at the entrance to obtain data, a data capturing device for receiving subset data, and a processor for matching person data and subset data to provide information related to a time, geographic, behavioural, or demographic dimension. The subset data may include a unique identifier, an entry time, an exit time and a location data for each person of interest. In this method and arrangement, the persons are detected and tracked and the data associated with persons and tracks is used in combination with subset data from the data capturing devices to separately count and track anonymous persons and defined persons that are associated with mobile handsets.

Such methods and arrangements have the disadvantage that it is complex and expensive to install and operate them because the defined persons have to carry technical devices like mobile handsets and because elaborated technical devices are required as data capturing devices in order to obtain the subset data. These technical devices are expensive and have to be maintained. Furthermore, in operation, the defined persons have to be urged to permanently carry their technical devices for ensuring proper operation of the method and arrangement.

SUMMARY OF THE INVENTION

It is the object of the invention to create a method and an arrangement pertaining to the technical field initially mentioned, that enable efficiently and inexpensively to determine a group of persons to be considered staying in an observation region by considering exception markings for other persons who are not to be considered.

The solution of the invention is specified by the features of claim 1. According to the invention, at least one image is recorded of the observation region, and in the at least one image, the persons staying in the observation region and optical signatures of the exception markings are detected, wherein the detected optical signatures are assigned to detected persons. Furthermore, a detected group of the detected persons in the observation region is determined excluding the detected persons with assigned detected optical signature, wherein the detected group is the group of the persons to be considered, wherein the exception markings are graphic pattern with at least one characteristic length ratio.

The arrangement according to the invention includes at least one image recording device for recording at least one image of the observation region. Furthermore, the arrangement includes a person detection module for detecting in the at least one image the persons staying in the observation region and an exception marking detection module for detecting optical signatures of the exception markings. Additionally, the arrangement includes an assignment module for assigning the detected optical signatures to detected persons and a group detection module for determining a detected group of the detected persons in the observation region excluding the detected persons with assigned detected optical signature, wherein the detected group is the group of the persons to be considered. Thereby, the exception markings are graphic pattern with at least one characteristic length ratio.

According to the invention, the method and the arrangement are for determining a group of persons to be considered staying in an observation region by considering exception markings for other persons. Thereby, the group of persons to be considered is a group of the persons staying in the observation region excluding the other persons who stay in the observation region and carry one of the exception markings. Thus, the persons who stay in the observation region and carry one of the exception markings are referred to as other persons because they are to be excluded from the group of persons to be considered staying in the observation region.

In a first preferred variant, the exception markings are the same for all other persons and thus for all persons to be excluded from the group of persons to be considered. In a second preferred variant, in order differentiate between groups of other persons, the exception markings are of different exception marking types. Thereby, other persons belonging to one group of other persons each carry one of the exception markings of one exception marking type, while other persons belonging to another group of other persons each carry one exception marking of another exception marking type. In a third preferred variant, the exception markings are personalised in that each person carrying one of the exception markings carries an exception marking of a different exception marking type. In other words, in this third preferred variant, each other person carries an exception marking of a different exception marking type. In the method according to the invention, at least one image is recorded of the observation region. Preferably, this at least one image is recorded with at least one image recording device. Thereby, the at least one image recording device is for example a photo camera, a video camera, a stereo camera or the like. Independent of the type of image recording device, the at least one image recording device is preferably the at least one image recording device included in the arrangement according to the invention.

In the method and the arrangement according to the invention, the at least one image recording device is advantageously oriented overhead and arranged above the observation region. This has the advantage that the persons in the observation region can easily be detected in the at least one image recorded by the respective at least one image recording device because the risk of one person covering another person in the at least image is reduced. Consequently, the detection rate of the persons is increased, enabling a more reliable determination of the group of persons to be considered.

In the method according to the invention, in the at least one image, the persons staying in the observation region and optical signatures of the exception markings are detected, wherein the detected optical signatures are assigned to detected persons. Thereby, it is irrelevant whether the persons staying in the observation region or the optical signatures of the exception markings are detected first. Furthermore, it is irrelevant when the detected optical signatures are assigned to detected persons. In one example, the persons and the optical signatures are detected first and then assigned to detected persons. This can for example be achieved by evaluating distances between positions of detected persons and positions of detected signatures. In another example, the detected persons are searched for an optical signature of an exception marking and if such an optical signature is found, the respective optical signature assigned to the respective searched person and the respective searched person thus considered as other person who is not to be considered. Thereby, it is irrelevant whether this search for an optical signature of an exception marking on a particular detected person is performed after all persons have been detected or whether this search is performed each time immediately when the respective person is detected.

Preferably, a person detection module is employed for detecting in the at least one image the persons staying in the observation region. This person detection module is preferably the person detection module included in the arrangement according to the invention. Advantageously, all of the persons staying in the observation region are detected in the at least one image.

Preferably, an exception marking detection module is employed for detecting the optical signatures of the exception markings. This exception marking detection module is preferably the exception marking detection module included in the arrangement according to the invention. Advantageously, all of the optical signatures of the exception markings are detected in the at least one image.

Preferably, an assignment module is employed for assigning the detected optical signatures to detected persons. This assignment module is preferably the assignment module included in the arrangement according to the invention.

In case more than one image recording devices are employed in the method according to the invention or the arrangement according to the invention, respectively, there are different ways of treating the images recorded with these different image recording devices. In such cases where two or more image recording devices are employed, it is possible that each one of the two or more image recording devices covers the entire observation region. In another example, however, the two or more image recording devices each cover a part of the observation region, wherein the two or more image recording devices together cover the entire observation region. In this latter case, images recorded with the different image recording devices cover parts of the observation region. By combining the images recorded with the different image recording devices at a same point in time, a global image covering the entire observation region at the respective point in time can be obtained. In a variant, the images recorded with the different image recording devices at a same point in time can be analysed individually and the information about the persons and the optical signatures detected in the images can be combined to a global data set. Thus, in case positions of the persons detected in the images are determined, these positions can be mapped in a two or three dimensional map representing the entire observation region. Thereby, since the images may cover partially overlapping regions, care is to be taken that particular persons and possible optical signatures may be detected in the images recorded with different image recording devices at a same point in time. Methods for identifying such persons and assigning such persons to one detected person, thus generating a global list of detected persons present in the observation region are known in the art.

In one example, the images recorded by the different image recording devices at a same point in time are combined to a global image before detecting in the global image the persons staying in the observation region and the optical signatures of the exception markings. In another example, the persons staying in the observation region and the optical signatures of the exception markings are detected in the images of the individual image recording devices. In yet another example, the persons staying in the observation region and the optical signatures of the exception markings are detected in the images recorded by the individual image recording devices, and the positions of the detected persons are then mapped in a two or three dimensional map representing the observation region. In this latter example, the positions of the detected optical signatures are mapped in the map, too, and then assigned to detected persons, or the detected optical signatures are assigned to detected persons before the positions of the detected persons are mapped together with information on possibly assigned optical signatures in the map.

Independent of whether only one image recording device or whether more than one image recording device is employed, the at least one image recorded with the image recording device is not required to only show the observation region. Furthermore, the observation region can have any shape. In an example, the observation region is visible in an image recorded with the image recording device as disk with a circular shape within an image, wherein the image shows as well regions around the observation region. In another example, a part of the observation region is visible in a part of an image recorded with one image recording device, while the remaining part of the observation region is visible in a part of an image recorded with another image recording device. Thus, by combining the images recorded with the two image recording devices, the entire observation region and some region not belonging to the observation region is visible in the images. Even more, the observation region can be defined according to the specific requirements as long as it is visible in the at least one image recorded with the at least one image recording device.

In the method according to the invention, a detected group of the detected persons in the observation region is determined excluding the detected persons with assigned detected optical signature, wherein the detected group is the group of the persons to be considered. Thus, the detected group is simply the group of the detected persons in the observation region without the detected persons with assigned detected optical signature.

According to the invention, the exception markings are graphic pattern with at least one characteristic length ratio. On the one hand, the exception markings being graphic pattern has the advantage that persons to be excluded from the group of persons to be considered can be marked as other persons easily and at very low costs. On the other hand, the at least one characteristic length ratio has the advantage that recognition of the graphic pattern is simplified even in case the respective graphic pattern is tilted with respect to an image plane of the at least one image. Thus, a reliable recognition of the persons not to be considered for determining the group of persons to be considered is enabled. Consequently, a cost effective, stable and reliable method for determining the group of persons to be considered staying in the observation region by considering exception markings for other persons is provided. Furthermore, an arrangement for determining the group of persons to be considered staying in an observation region by considering exception markings for other persons is provided which enables a cost effective, stable and reliable determination of the group of persons to be considered. Thus, an efficient and inexpensive way to determine a group of persons to be considered staying in an observation region by considering exception markings for other persons who are not to be considered is provided.

Advantageously, a total number of the detected persons in the observation region is determined excluding the detected persons with assigned detected optical signature, wherein the total number is a number of the persons in the group of persons to be considered. Accordingly, the method is advantageously for determining a number of persons to be counted staying in the observation region by considering exception markings for other persons, wherein the number of persons to be counted is a counter of the persons staying in the observation region excluding the other persons who stay in the observation region and carry one of the exception markings. Thereby, the persons to be counted are the persons to be considered. Thereby, it is irrelevant how the total number of detected persons in the observation region excluding the detected persons with assigned detected optical signature is determined. In one example, only the detected persons not having an assigned optical signature are counted. In another example, all the detected persons are counted and in addition, the detected persons with an assigned optical signature are counted, after what the number of the detected persons with an assigned optical signature is subtracted from the number of all the detected persons in order to obtain the total number of detected persons in the observation region excluding the detected persons with assigned detected optical signature.

In a variant, a total number of the detected persons in the observation region carrying one of the detection markings is determined. Thus, the total number of persons in the group of persons carrying one of the detection markings is determined. In case the exception markings are of at least two different exception marking types, wherein each of the exception marking types is defined by exception marking type values of the at least one characteristic length ratio provided by the exception markings of the respective exception marking type, preferably a total number of the detected persons in the observation region carrying one of the detection markings of a particular one of the at least two different exception marking is determined. Thus, the total number of persons in the group of persons carrying one of the detection markings of the particular one of the at least two different exception markings is determined. In either of these variants where a total number of any group of persons is determined, the total number is preferably determined with a counting module. Advantageously, this counting module is included in the arrangement according to the invention. This counting module advantageously included in the arrangement according to the invention is thus advantageously for determining a total number of persons in a group of detected persons.

In a variant, the above mentioned person detection module, exception marking detection module, assignment module, group detection module and counting module are physically separated units. Thereby, they can comprise circuitries or they can be implemented in the form of software modules running on a computer. In a variant, the person detection module, the exception marking detection module and the assignment module are comprised in a same detection and assignment unit, while the group detection module and the possibly present counting module are each a physically separated unit or combined comprised in a group detection and counting unit. In this sense, the person detection module, the exception marking detection module and the assignment module can for example be comprised in the at least one image recording device or the two or more image recording devices, while the group detection module and possibly present counting module are comprised in a computer. In yet another variant, the person detection module, exception marking detection module, the group detection module and possibly present counting module are comprised in a same detection and counting unit, while the assignment module is a physically separated unit. In yet another variant, the person detection module and the exception marking detection module are each a separate unit or a combined unit, while the assignment module, the group detection module and the possibly present counting module are comprised in a same assignment and counting unit. In this sense, the person detection module and the exception marking detection unit can for example be comprised in the at least one image recording device or the two or more recording devices, while other modules are comprised in a computer. In another variant, the person detection module can for example be comprised in the at least one image recording device or the two or more image recording devices, while the other modules are comprised in a computer.

Preferably, each exception marking is one graphic pattern with at least one characteristic length ratio. This has the advantage that a reliable detection of the optical signatures of the exception markings in the at least one image is enabled.

Advantageously, for each exception marking, each one of the at least one characteristic length ratio is a ratio of two lengths and thus of a pair of lengths provided by the respective graphic pattern and thus respective exception marking. Thus, preferably, each graphic pattern provides a number of characteristic length ratios being the number of the different ratios of different pairs of lengths provided by the respective graphic pattern. Thereby, each pair of lengths on which one of the at least one characteristic length ratio is based can consist of two lengths having a same absolute value or different absolute values, thus resulting in a characteristic length ratio being 1:1 or being different from 1:1, respectively. In order to determine a particular one of the at least one characteristic length ratio, it can be sufficient to determine the absolute values of the two lengths of concern for the particular one of the at least one characteristic length ratio. This is particularly the case if the absolute values of the two lengths in the exception markings are known. In case the absolute values of the two lengths in the exception marking are not known or in case the absolute values of the two lengths of concern for the particular one of the at least one characteristic length ratio cannot reliably be determined from the at least one image because for example a distance between the image recording device and the respective exception marking is unknown, the ratio of the two lengths determined from the image can be calculated in order to determine the corresponding one of the at least one characteristic length ratio. Consequently, in that for each exception marking, each one of the at least one characteristic length ratio is a ratio of two lengths and thus of a pair of lengths provided by the respective graphic pattern and thus respective exception marking, a very reliable detection of the optical signatures of the exception markings in the at least one image is enabled.

In a first preferred variant, all of the exception markings are of a same exception marking type, wherein the exception marking type is defined by exception marking type values of the at least one characteristic length ratio provided by the exception markings of the exception marking type. Thus, for each exception marking of the exception marking type, the at least one characteristic length ratio provides values being the exception marking type values of the exception marking type.

In a second preferred variant, the exception markings are of at least two different exception marking types, wherein each of the exception marking types is defined by exception marking type values of the at least one characteristic length ratio provided by the exception markings of the respective exception marking type. Thus, for each one of the exception marking types, for each exception marking of the respective exception marking type, the at least one characteristic length ratio provides values being the specific exception marking type values of the respective exception marking type. Thereby, each pair of the at least two different exception marking types is distinguishable by at least one of the specific exception marking type values being different for the two exception marking types of the respective pair of different exception marking types. This has the advantage that different exception marking types are provided, enabling distinction between different groups of persons carrying exception markings of these different exception marking types.

In either of the two before mentioned preferred variants, in case for a particular exception marking type, one of the at least one characteristic length ratio is a ratio of two lengths and thus of a pair of lengths provided by the respective graphic pattern, the corresponding exception marking type value is in a preferred variant the value of the ratio of the respective two lengths. In a preferred variant where the absolute values of the lengths of the respective graphic pattern resulting in a respective one of the at least one characteristic length ratio are known, the absolute values of the lengths resulting in the respective one of the at least one characteristic length ratio are the corresponding exception marking type values. Of course, in either of these two preferred variants, there is the variant where the respective exception marking type values comprise both the absolute values of the respective lengths and the value of the ratio of the respective lengths being the respective one of the at least one characteristic length ratio.

These variants where the exception marking type values of a particular one of the at least one characteristic length ratio of a particular exception marking type are the ratio of the lengths, the absolute values of the lengths in the respective graphic pattern or both the ratio of the lengths and the absolute values of the lengths in the respective graphic pattern, apply for the cases where for each exception marking, each one of the at least one characteristic length ratio is a ratio of two lengths and thus of a pair of lengths provided by the respective graphic pattern, too. This applies independent of whether all of the exception markings are of a same exception marking type or whether the exception markings are of at least two different exception marking types.

Preferably, the exception markings are graphic pattern with at least two, preferably at least three characteristic length ratios. This has the advantage that due to the at least two or the at least three characteristic length ratios, respectively, the exception markings can more easily be distinguished from pattern on cloths, bags or accessories and the like. Thus, an even more reliable recognition of persons not to be considered for determining the group of persons to be considered staying in the observation region is enabled. Thereby, the reliability is increased with increasing number of characteristic length ratios. The at least two or the at least three characteristic length ratios, respectively, can easily be obtained in that the exception markings are each a graphic pattern providing in case of at least two characteristic length ratios at least three different lengths and in case of at least three characteristic length ratios at least four different lengths. Thus, in order to provide a particular number of characteristic length ratios, it is sufficient for the respective graphic pattern to provide a number of different lengths being the particular number of characteristic length ratios plus one. Of course, in case each possible pair combination of lengths is used to determine one of the characteristic length ratios, a larger number of characteristic length ratios can be provided with a given number of lengths. However, in this latter case, there will be redundancies which do not significantly increase the reliability of the recognition of persons not to be considered for determining the group of persons to be considered staying in the observation region.

In an alternative, the exception markings are graphic pattern with one characteristic length ratio only.

Advantageously, each of the exception markings is a graphic pattern located on a surface of a marking carrier. Since the exception markings are graphic pattern with at least one characteristic length ratio, it is thereby not required that the marking carriers are part of the exception markings. Rather, the graphic pattern are located on the surface of the respective marking carrier, wherein those persons who are to be excluded from the group of persons to be considered advantageously carry one of the marking carriers and thus carry one of the exception markings. This has the advantage that the persons to be excluded from the group of persons to be considered can easily be marked as other persons.

Preferably, the surfaces of the marking carriers are a plain surface or a two dimensional, bent surface in three dimensional space. Thereby, the surface itself can constitute the graphic pattern or the graphic pattern can be applied on the surface. In case the surface itself constitutes the graphic pattern, the marking carrier can for example include different materials with different colours, the materials being arranged adjacent to each other such that the respective graphic pattern with the at least one characteristic length ratio is provided. In case the graphic pattern is applied on the surface, the graphic pattern can for example be printed onto the surface. Examples of marking carriers are cloths like vests, pullover, jackets, trousers, hats or caps. Other examples of marking carriers are badges like name badges or tags like name tags or stickers which can be stuck onto clothes or the skin.

In case for each exception marking, each one of the at least one characteristic length ratio is a ratio of two lengths and thus of a pair of lengths provided by the respective graphic pattern and each of the exception markings is a graphic pattern located on a surface of a marking carrier, advantageously for each pair of lengths resulting in one of the at least one characteristic length ratio, the lengths are measured along a reference line on the surface of the marking carrier. This has the advantage that the location and orientation on the graphic pattern where the lengths are to be measured is clearly defined, thus simplifying the detection of the optical signatures of the exception markings. Thereby, for each pair of lengths resulting in one of the at least one characteristic length ratio, the corresponding reference line is preferably a shortest connecting line between two points on the surface of the marking carrier. In a first variant thereof, for each one of the pairs of lengths resulting in one of the at least one characteristic length ratio, the reference line is different. In a second variant thereof, the reference lines are the same for some of the pairs of lengths resulting in one of the at least one characteristic length ratio. In a third variant thereof, the reference lines are the same line for all of the pairs of lengths resulting in one of the at least one characteristic length ratio. Thus, in this second and third variant, the lengths of at least some of the pairs of lengths which result in one of the at least one characteristic length ratio are measured on a same reference line. Thus, in this case, the graphic pattern preferably provides two or more characteristic length ratios, wherein the lengths for more than one of the two or more characteristic length ratios are measured along the same reference line. Thereby, the lengths for this more than one of the two or more characteristic length ratios are preferably determined as a sequence of lengths along the reference line. This sequence of lengths has the advantage that a more reliable detection of the optical signatures of the respective exception markings is enabled because pattern on cloths or bags providing the two or more characteristic length ratios can be excluded from being mistakenly considered as optical signatures if the respective lengths provided by the pattern on the respective cloth or bag are not provided in the corresponding sequence of lengths. Thus, preferably, the respective graphic pattern advantageously provide a sequence of at least three lengths along a reference line which provide more than one of the two more characteristic length ratios.

Alternatively, the lengths of the pairs of lengths resulting in one of the at least one characteristic length ratio are measured along different lines on the surface of the marking carrier.

Preferably, the graphic pattern of the exception markings are each a pattern of parallel lines. This has the advantage that the optical signatures of the exception markings are simple to be detected and that at the same time, due to the parallel lines, an orientation of the lines can easily be used for determining the directions along which the lengths for determining the at least one characteristic length ratio are to be measured.

Preferably, the parallel lines of the graphic pattern are a sequence of lighter and darker bars. In a variant, the parallel lines of the graphic pattern are a sequence of bars in different colours. In either case, the stronger the contrast between the bars is, the more reliable detection of the exception markings is enabled.

The persons who stay in the observation region and carry one of the exception markings and who are thus also referred to as other persons preferably carry the graphic pattern with the parallel lines oriented essentially vertically in space. Thereby, essentially vertically preferably means that the parallel lines are oriented exactly vertical or tilted at an angle of maximally 45°, particular advantageously maximally 30°, to an exact vertical line when the respective other person who carries the respective exception marking is standing or sitting. This particular advantageous in case the other persons who carry one of the exception markings carry their exception marking on their upper body like for example their chest.

In an advantageous variant, the other persons preferably carry the graphic pattern with the parallel lines oriented essentially horizontally in space. Thereby, essentially horizontally preferably means that the parallel lines are oriented exactly horizontal or tilted at an angle of maximally 45°, particular advantageously maximally 30°, to an exact horizontal line when the respective other person who carries the respective exception marking is standing or sitting. This is particular advantageous in case the other persons who carry one of the exception markings carry their exception marking on their shoulders or head or on a hat or cap.

Alternatively, the graphic pattern of the exception markings differ from pattern of parallel lines.

If the graphic pattern of the exception markings are each a pattern of parallel lines, then advantageously for each of the graphic pattern, each one of the at least one characteristic length ratio is a ratio of two lengths measured perpendicular to the parallel lines of the respective graphic pattern. This is a special case of the before mentioned advantageous case where for each pair of lengths resulting in one of the at least one characteristic length ratio, the lengths are measured along a reference line on the surface of said marking carrier. In this present special case, since the lengths are measured perpendicular to the parallel lines of the respective graphic pattern, the lengths preferably correspond to a width of one of the parallel lines or to a distance between two of the parallel lines. Thus, the lengths are preferably distances measured between longitudinal edges of the lines. Particular preferably, the lengths are the distances measured between adjacent longitudinal edges of the lines. This means, if the parallel lines of the graphic pattern are considered as a sequence of lighter and darker bars, each length is preferably the distance between the longitudinal edges of one particular bar, wherein the particular bar is a lighter bar or a darker bar of the sequence of lighter and darker bars. Consequently, the lengths are particularly simple to be determined in order to determine the at least one characteristic length ratio.

In a variant, however, each one of the at least one characteristic length ratio is a ratio of two lengths measured along the parallel lines of the respective graphic pattern. For example, the lengths may be the lengths of individual ones of the parallel lines of the respective graphic pattern.

In case for each exception marking, each one of the at least one characteristic length ratio is a ratio of two lengths and thus of a pair of lengths provided by the respective graphic pattern, preferably in the at least one image, edge peaks are determined and relative distances between the edge peaks are determined being the lengths for determining the at least one characteristic length ratio. This has the advantage that a simple and reliable way for detecting the at least one characteristic length ratio is provided. Advantageously, the edge peaks and relative distances between them are determined in the at least one image by the exception marking detection module.

Advantageously, in order to determine the edge peaks in the at least one image, linear gradients are calculated from the at least one image and the linear gradients are examined for minima and maxima, the minima and maxima, respectively, being the edge peaks.

Thereby, the linear gradients are preferably gradients in the respective image calculated along lines in the respective image. These gradients can for example be the variation in grey tone from pixel to pixel along the respective line in the respective image. Thus, in a first preferred variant, the at least one image is a black and white image on a grey scale. In a second preferred variant however, the at least one image is a colour image, wherein the at least one image is transformed into a black and white image on a grey scale before calculating the linear gradients. In other variants, in case the at least one image is a colour image, the linear gradients are calculated for a particular colour channel of the respective image or for the brightness of the pixels in the respective image. In either variant, a linear gradient is obtained, indicating a change rate in the image measured along a line. Thereby, wherever an absolute value of the linear gradient and thus of the change rate is particular large and exceeds a threshold value, the respective position on the line is considered as an edge peak.

Particular advantageously, the linear gradients are examined for a particular number of minima and maxima, the minima and maxima, respectively, being the edge peaks in order to determine whether these edge peaks form endpoints of the lengths related to the at least one characteristic length ratio. Advantageously, the linear gradients are calculated from the at least one image by scanning the at least one image along lines having a predefined base line orientation in the respective image. In a preferred variant, the linear gradients are calculated from the at least one image by scanning the at least one image additionally along lines being tilted with respect to the predefined base line orientation by an angle of plus 45° and along lines being tilted with respect to the predefined base line orientation by an angle of minus 45°.

In case the graphic pattern of the exception markings are each a pattern of parallel lines, the predefined base line orientation is advantageously chosen to be essentially perpendicular to the parallel lines. This can easily be obtained in case the persons staying in the observation region and carrying one of the exception markings carry the graphic pattern with the parallel lines oriented essentially vertically in space. In that case, the orientation of the image recording device used for recording the at least one image can be used to define and orient the predefined base line orientation essentially perpendicular to the parallel lines. This enables a very efficient detection of the optical signatures of the exception markings in particular if for each one of the graphic pattern, each one of the at least one characteristic length ratio is a ratio of two lengths measured perpendicular to the parallel lines of the respective graphic pattern.

Alternatively, the at least one characteristic length ratio is determined differently.

Advantageously, the other persons who stay in the observation region and carry one of the exception markings carry their exception marking on their upper body, particular advantageously on their chest. This has the advantage that detection of the optical signatures of the exception markings can be detected more easily. This advantage is particularly pronounced in case the at least on image recording device with which the at least one image is recorded is mounted overhead above the observation region.

Preferably, for each one of the at least one image, position data is obtained from each person detected in the respective one of the at least one image. This position data includes preferably a position of the respective person in the respective one of the at least one image. This has the advantage that inspection of the respective one of the at least one image for optical signatures of exception markings can be limited to areas of the respective one of the at least one image where one of the detected persons is positioned.

Thus, detecting the optical signatures of the exception markings can be effected in less time, which increases the speed at which the group of persons to be considered in the observation region excluding the persons staying in the observation region and carrying one of the exception markings can be determined.

In case the other persons who stay in the observation region and carry one of the exception markings carry their exception marking on their upper body, in particular on their chest, it is particular advantageous if the position data includes a position of the head of the respective person in the respective one of the at least one image. This has the advantage that positions of the areas of the respective one of the at least one image to be inspected for optical signatures of exception markings can easily be estimated, enabling limiting the areas to be inspected for the optical signatures of the exception markings further. In order to increase reliability of the detection of the optical signatures of the exception markings further, for each person detected in one of the at least one image, preferably a position of the respective persons head is determined in three dimensional space. Based from this position of the respective persons head in three dimensional space, preferably a position of the respective persons chest is determined in three dimensional space, from which the area in the respective one of the at least one image where the respective persons chest is to be expected is determined. Thus, advantageously this area of the respective one of the at least one image is inspected for an optical signature of an exception marking possibly carried by the respective person. In a preferred variant, this area of the respective one of the at least one image is extracted from the respective one of the at least one image and normalised before inspection for an optical signature of an exception marking possibly carried by the respective person.

Advantageously, the at least one image provides a resolution sufficient to resolve the exception markings carried by the persons staying in the observation region and carrying one of the exception markings with a resolution in a range of about 0.5 pixel per mm to 2 pixel per mm, particular advantageously about 1 pixel per mm. Alternatively, however, other resolutions of the at least one image are possible, too.

Preferably, the at least one image is an image recorded in the visible spectrum of electromagnetic wavelengths. This has the advantage that testing and verification of the method and arrangement according to the invention is simplified. Furthermore, the method and arrangement according to the invention are cheaper to purchase and install, since image recording devices for recording images in the visible spectrum of electromagnetic wavelengths are readily available and inexpensive.

Thereby, it is irrelevant whether the at least one image is a black and white image with grey scale or whether the at least one image is a colour image, as long as the at least one image is recorded in the visible spectrum of electromagnetic wavelengths. Preferable, the visible spectrum of electromagnetic wavelengths covers wavelengths in a range from about 400 nm to about 750 nm.

Preferably, in the method, a video sequence of the observation region comprising a multiplicity of frames and thus of images is recorded. Consequently, the at least one image is a multiplicity of images. Thereby, each image is a frame of the video sequence. Thus, the at least one image recording device included in the arrangement is advantageously capable of recording video sequences. For example, the at least one image recording device can be a video camera or a stereo camera.

Recording the video sequence of the observation region comprising the multiplicity of frames and thus images has the advantage that the group of persons to be considered staying in the observation region by considering exception markings for other persons can be determined in several succeeding images in the video sequence, thus improving reliability of the determined group of persons to be considered.

In case in the method, a video sequence of the observation region comprising a multiplicity of frames and thus of images is recorded, the persons staying in the observation region are preferably tracked over two or more, five or more, or ten or more images of the multiplicity of images. Thereby, the two or more, five or more, or ten or more images can be, but are not required to be directly successive images in the video sequence.

In a preferred variant, the persons staying in the observation region are tracked over several images of the multiplicity of images. Thereby, detected persons who have a certain number of times like for example once, twice, five or ten times received a detected optical signature assigned preferably maintain the detected optical signature assigned as long as they are tracked. This has the advantage that even if a person turns away from an image recording device or is partially covered by an object or another person such the exception marking carried by the respective person is no longer visible in the images recorded by the respective image recording device, the person can be kept marked as other person who is not to be considered. Thus, a highly robust method for determining a group of persons to be considered staying in an observation region by considering exception markings of other persons is provided.

Such a tracking of the persons in the observation region has the advantage that further information on the persons in the observation region can be obtained at the same time as the group of persons to be considered is determined. For example, several different modes of counting persons can easily be implemented. In an example already mentioned, the number of persons in the group of persons to be considered is determined. In another example already mentioned, the number of persons in the observation region carrying one of the exception markings of a particular exception marking type is determined. In yet another example, the persons to be considered which cross a (virtual) counting line in a particular direction are counted. In yet another example, the persons carrying one of the exception markings of a particular exception marking type which cross a (virtual) counting line in a particular direction are counted. In these latter two examples, the (virtual) counting line is in one variant an entrance in the observation region such that the respective persons entering the observation region are counted. In another variant, the (virtual) counting line is an exit from the observation region such that the respective persons leaving the observation region are counted. In yet another variant, the (virtual) counting line is a line in a corridor or in front of a passage such that simply the passing respective persons are counted. Of course, two or more of these examples and variants of modes of counting persons can be realised simultaneously.

Besides these modes of counting persons, the tracking of the persons in the observation region can be visualised. In one example, an image is created showing the observation region and possibly an area around the observation region, wherein persons to be considered are marked in the image as dots in a particular colour, while other persons are marked in the image as dots in another colour. In case these other persons are carrying exception markings of two or more different exception marking types, the persons can be marked in the image with a colour corresponding to their respective exception marking type. Furthermore, statistics on the number of persons to be considered and number of persons carrying one of the exception markings as well as the number persons to be considered and/or other persons having passed a particular (virtual) counting line can be indicated in the image.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
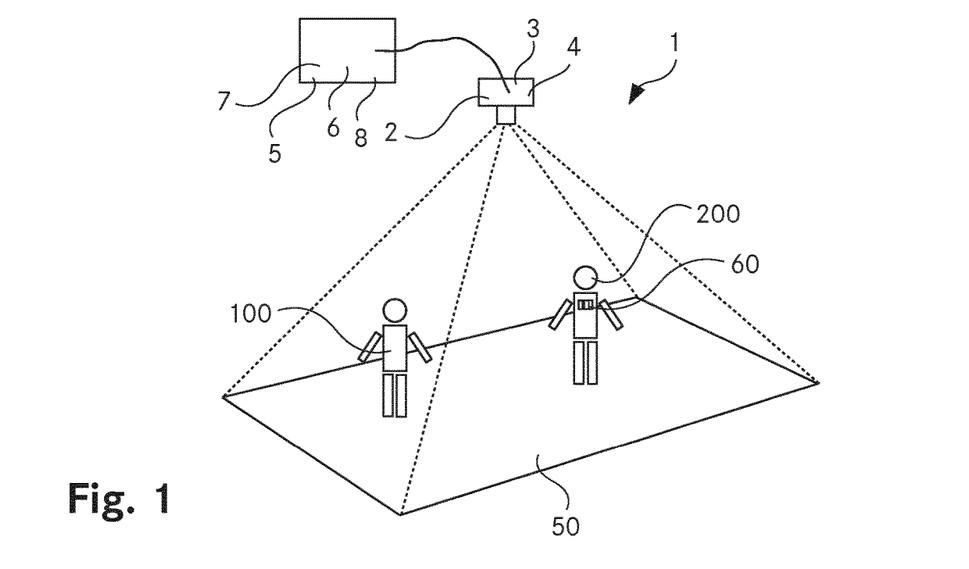
FIG. 1 a simplified, schematic view of a first arrangement according to the invention, FIG. 2 a simplified, schematic view of a second arrangement according to the invention, FIG. 3 a float chart illustrating the method according to the invention, FIG. 4 an exception marking exemplary for the exception markings employed in the method and arrangement according to the invention, FIG. 5 an image recorded with an image recording device of an arrangement according to the invention, FIG. 6 an normalised areal image of an area extracted from the image recorded with the image recording device, and FIG. 7 an image of linear gradients calculated along horizontal lines in the normalised areal image.

FIG. 1 shows a simplified, schematic view of a first arrangement 1 according to the invention for determining a group of persons 100 to be considered staying in an observation region 50 by considering exception markings 60 for other persons 200, wherein the group of persons 100 to be considered is a group of the persons 100 staying in the observation region 50 excluding the other persons 200 who stay in the observation region 50 and carry one of the exception markings 60. Thereby, the exception markings 60 are graphic pattern with at least one characteristic length ratio.

The first arrangement 1 comprises an image recording device 2 for recording images of the observation region 50. More precisely, the image recording device 2 is a video camera for recording a video sequence of the observation region 50. Thus, the image recording device 2 is for recording a multiplicity of video frames being a multiplicity of images of the observation region 50. In other variants, the image recording device 2 is a photo camera or a stereo camera for recording individual stereo images or for recording stereo video sequences. In all these variants, the images recorded by the image recording device 2 are images in the visible spectrum of electromagnetic wavelengths. In further variants, the images are images in different ranges of the electromagnetic wavelengths.

Besides the image recording device 2, the first arrangement 1 comprises a person detection module 3 for detecting in the images the persons 100, 200 staying in the observation region 50 and an exception marking detection module 4 for detecting in the images optical signatures of the exception markings 60. Both the person detection module 3 and the exception marking detection module 4 are comprised in the image recording device 2. Furthermore, the first arrangement 1 comprises a computer 7 which is connected to the image recording device 2 for receiving data about the detected persons 100, 200 and the detected optical signatures of the exception markings 60 from the image recording device 2. The computer 7 comprises an assignment module 5 for assigning the detected optical signatures to detected persons 100, 200. Additionally, the computer 7 comprises a group detection module 6 for determining a detected group of the detected persons 100 in the observation region 50 excluding the detected persons 200 with assigned detected optical signature, wherein the detected group is the group of persons 100 to be considered. Additionally, the computer 7 comprises a counting module 8 for determining a total number of persons 100, 200 of a group of detected persons. Thereby, this group of persons is in one example the group of persons 100 to be considered. In another example, this group of persons is the group of the detected persons 200 with assigned detected optical signature.

In a variant, the assignment module 5 is comprised in the image recording device 2 instead of comprised in the computer 7. In this variant, the computer 7 receives from the image recording device 2 at least data about the detected persons 100 to be considered who have not an assigned optical signature. Whether the computer 7 receives as well data about the detected persons 200 having an assigned optical signature and are thus other persons 200 who are to be excluded from the group of persons 100 to be considered is optional. In case data about these other persons 200 is to be gathered, the computer 7 receives such data, too.

In yet another variant, the person detection module 3 and the exception marking detection module 4 are comprised in the computer 7 instead of comprised in the image recording device 2. In this variant, the computer 7 is connected with the image recording device 2 for receiving the images recorded with the image recording device. Thus, the detection of the persons 100, 200 in the observation region 50, the detection of the optical signatures of the exception markings 60, the assignment of the detected optical signatures to persons 200 and the determination of the detected group of the detected persons 100 to be considered is performed by the corresponding modules in the computer 7.

Figure 2:
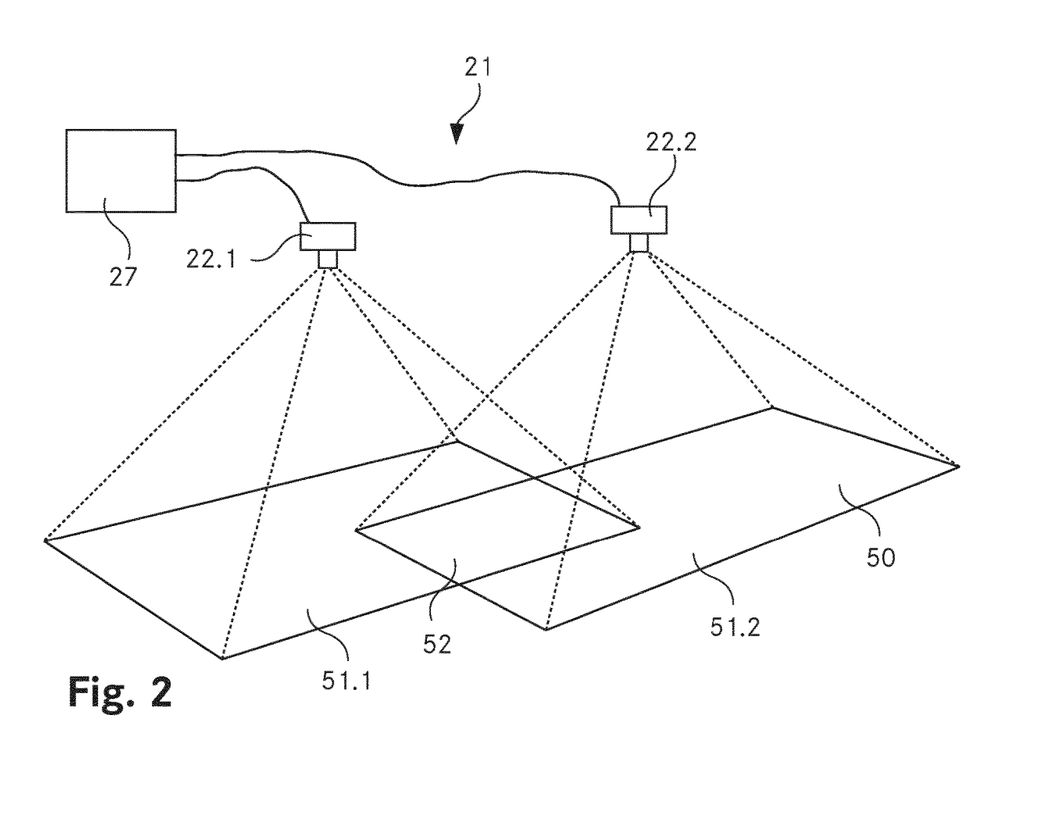

FIG. 2 shows a simplified, schematic view of a second arrangement 21 according to the invention for determining a group of persons 100 to be considered staying in an observation region 50 by considering exception markings 60 for other persons 200, wherein the group of persons 100 to be considered is a group of the persons 100 staying in the observation region 50 excluding the other persons 200 who stay in the observation region 50 and carry one of the exception markings 60. In contrast to the first arrangement 1 shown in FIG. 1, the second arrangement 21 shown in FIG. 2 comprises two image recording devices 22.1, 22.2, both being connected with the computer 27 of the second arrangement 21.

In the second arrangement 21, both image recording devices 22.1, 22.2 are each a video camera. Thus, each of the two image recording devices 22.1, 22.2 records video sequences with images of a part 51.1, 51.2 of the observation region 50. Together, the two image recording devices 22.1, 22.2 cover the entire observation region 50. However, the part 51.1 of the observation region 50 visible in the images recorded with a first one of the two image recording devices 22.1 overlaps only partially the part 51.2 of the observation region 50 visible in the images recorded with the second one of the two image recording devices 22.2. Thus, there is an overlapping area 52 covered by both image recording devices 22.1, 22.2. Persons located in this overlapping area 52 are detected in the images of both image recording devices 22.1, 22.2. In order to avoid considering these persons double, the arrangement 21 organises the detected persons 100, 200 by determining a totality of detected persons. In this totality of detected persons, the persons detected in the images of the first one of the image recording devices 22.1 and the persons detected in the images of the second one of the image recording devices 22.2 are collected. Thereby, persons detected in the overlapping area 52 who are detected in the images of both image recording devices 22.1, 22.2 are considered only once. Algorithms for determining such a totality of detected persons are known in the art. An example of such an algorithm is described in EP 2 600 611 A1 of Xovis AG.

In both the first arrangement 1 and the second arrangement 21, the detected persons 100, 200 are tracked. Thereby, in case an optical signature of an exception marking 60 is detected assigned to a particular tracked and thus detected person 200 over more than ten images recorded at different points in time, the respective tracked person 200 is considered as a detected person 200 with an assigned optical signature even in case in the images recorded at later points in time, no optical signature is assigned to the respective person 200. This ensures that persons carrying an exception marking 60 who turn away from the respective image recording device 2, 22.1, 22.2 or carry the exception marking 60 covered and thus not visible in the images recorded with the respective image recording device 2, 22.1, 22.2 are still properly recognised as other persons carrying one of the exception marking 60.

Figure 3:
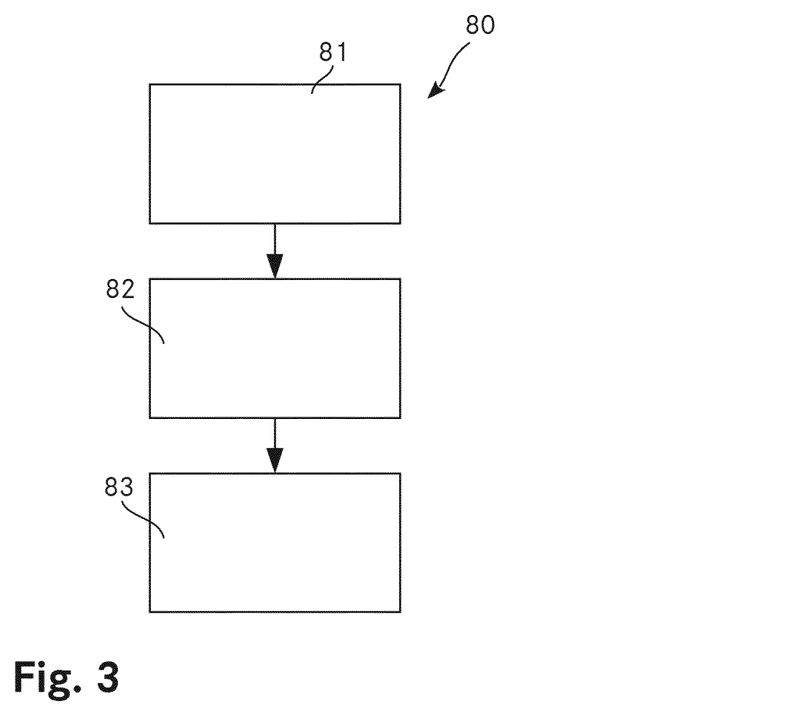

FIG. 3 shows a float chart illustrating the method 80 according to the invention for determining a group of persons 100 to be considered staying in an observation region 50 by considering exception markings 60 for other persons 200, wherein the group of persons 100 to be considered is a group of the persons 100 staying in the observation region 50 excluding the other persons 200 who stay in the observation region 50 and carry one of the exception markings 60. Thereby, the exception markings 60 are graphic pattern with at least one characteristic length ratio.

In the method 80 according to the invention, at least one image is recorded of the observation region 50 as indicated by field 81 in FIG. 3. In this at least one image, the persons 100, 200 staying in the observation region 50 and the optical signatures of the exception markings 60 are detected and the detected optical signatures are assigned to detected persons 200 as indicated by field 82 in FIG. 3. Thereby, it is irrelevant whether the persons 100, 200 or the optical signatures of the exception markings 60 are detected first. Furthermore, it is irrelevant when the detected optical signatures are assigned to detected persons 200. In one example, the optical signatures are detected first and then assigned to detected persons 200. In another example, the detected persons 100, 200 are searched for an optical signature of an exception marking 60 and if such an optical signature is found, the respective optical signature is assigned to the searched person 200 and the searched person 200 is thus considered as other person 200 who is not to be considered.

Finally, a detected group of the detected persons 100 in the observation region 50 is determined excluding the detected persons 200 with assigned detected optical signature, wherein the detected group is the group of the persons 100 to be considered. This is indicated in FIG. 3 with field 83.

Figure 4:
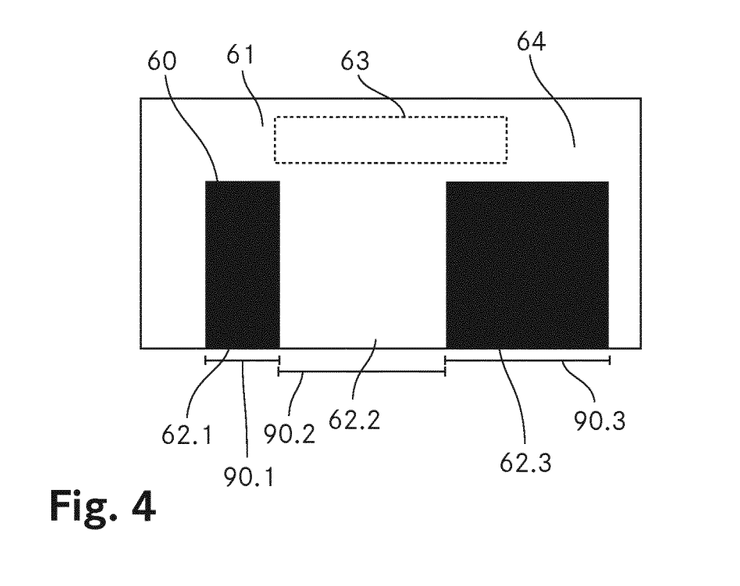

FIG. 4 shows an exemplary exception marking 60 employed in the first and second arrangements 1, 21 according to the invention shown in FIGS. 1 and 2 and in the method 80 according to the invention as illustrated in FIG. 3. This exemplary exception marking 60 is a graphic pattern with a pattern of parallel lines 62.1, 62.2, 62.3. These parallel lines 62.1, 62.2, 62.3 are black and white bars having different widths. These widths are characteristic for the exception marking 60 and enable detection of the optical signature of the exception marking 60 in the images recorded with the image recording device 2, 22.1, 22. 2. In particular, the widths of the parallel lines 62.1, 62.2, 62.3 of the exception marking 60 are detected. In order to determine these widths, a straight line is used as baseline in the images, the baseline being oriented essentially perpendicular to the parallel lines 62.1, 62.2, 62.3 of the exception markings 60 expected in the image. Variations in the darkness in the images along the straight line are analysed as explained further below in the context of FIGS. 5 to 7. Thereby, lengths 90.1, 90.2, 90.3 along the respective straight line are determined, wherein the lengths 90.1, 90.2, 90.3 correspond to the widths of the parallel lines 62.1, 62.2, 62.3 of the respective exception marking 60. In case the distance of the exception marking 60 from the image recording device 2, 22.1, 22.2 with which the image has been recorded is known, for example because the respective image recording device 2, 22.1, 22.2 is a stereo camera, the absolute value of the widths is determined. Additionally or in other cases where this distance is not known, the widths are determined in arbitrary units and ratios of pairs of the determined lengths 90.1, 90.2, 90.3 are determined. These ratios are characteristic length ratios of the exception marking 60.

The exemplary exception marking 60 shown in FIG. 4 is of a particular exception marking type. The characteristic length ratios of this exception marking 60 provide values being specific exception marking type values of the respective exception marking type. There is the option to employ only one exception marking type. This is sufficient for recognising the other persons 200 who are to be excluded from the group of persons 100 to be considered. However, it is as well possible to employ exception markings of two or even more different exception marking types. Thereby, each pair of the at least two different exception marking types is distinguishable by at least one of the specific exception marking type values being different for the two exception marking types of the respective pair of different exception marking types. Thus, different groups of other persons can be distinguished by carrying an exception marking of a different exception marking type.

The exception marking 60 shown in FIG. 4 is located on a surface 61 of a marking carrier 64. The marking carrier 64 is a name tag carried by the other persons 200 staying in the observation region 50 who are to be excluded from the group of persons 100 to be considered. The name tag comprises in its upper area a name 63 of the other person 200 carrying the respective name tag. In FIG. 4, the location of the name 63 is indicated with a dashed rectangle. Below the name 63, the name tag comprises the exception marking 60. Both the name 63 and the exception marking 60 are printed on shield of plastic forming the name tag to be attached to the chest the respective other person 200. When properly carried by the other person 200, the parallel lines 62.1, 62.2, 62.3 of the exception markings 60 are oriented vertical in space as long as the respective other person 200 stands or sits upright. This simplifies detection of the optical signature of the exception marking 60, because the widths of the parallel lines 62.1, 62.2, 62.3 can easily be measured along a horizontal line which eventually is perpendicular to an orientation of the parallel lines 62.1, 62.2, 62.3. Thus, this horizontal line acts as a reference line on the surface 61 of the marking carrier 64. Since the widths of the parallel lines 62.1, 62.2, 62.3 are measured along this reference line, the sequence of the widths of the parallel lines 62.1, 62.2, 62.3 along the reference line is determined, too. Thus, the additional information of the sequence simplifies the detection of the optical signature of the exception marking 60 further. Furthermore, the orientation of the horizontal line in an image recorded by the respective image recording device 2, 22.1, 22.2 can easily be approximated when the position and orientation of the respective image recording device 2, 22.1, 22.2 is known.

Figure 5:
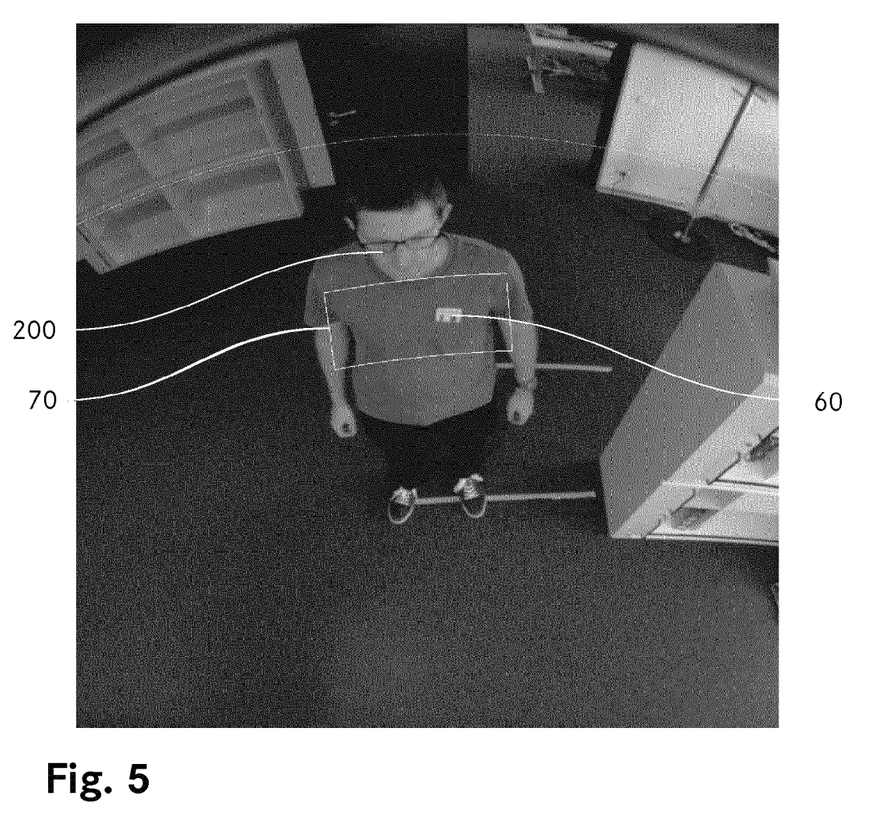

FIG. 5 shows an image recorded with the image recording device 2. It is a black and white image on a grey scale. According to the method 80, the person 200 visible in the image is detected and the optical signature of the exception marking 60 carried by the person 200 is detected and assigned to the person 200.

Figure 6:
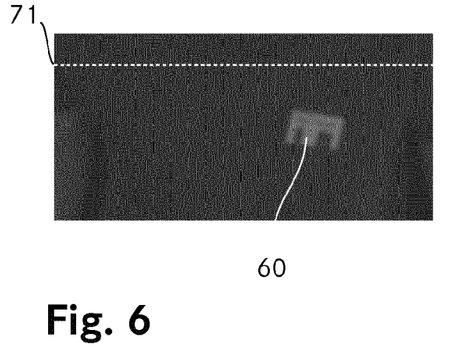
Figure 7:
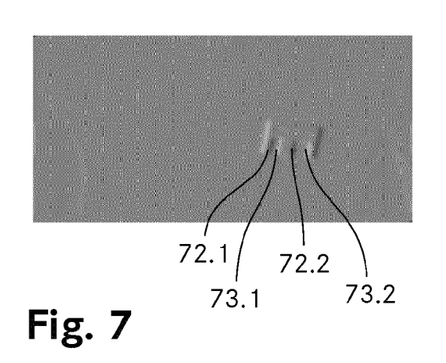

In more detail, the person 200 in the image is detected first. Thereby, the position of the head of the person 200 is detected and subsequently, the area in the image where the upper body of the person 200 is expected is identified. In FIG. 5, this area 70 is indicated with a white dashed line. This area 70 is extracted from the image and normalized and provided in the form of a normalized areal image as shown in FIG. 6. From this normalized areal image, linear gradients are calculated along the horizontal lines 71 of the normalized areal image. For illustration purposes, one of these horizontal lines 71 is indicated as a dashed white line in FIG. 6. Thus, for each horizontal line 71 of pixels in the normalized areal image, the difference between the grey tone of neighboring pixels is calculated. Thus, when considering the linear gradients along all horizontal lines of pixels in the normalized image, gradient image is obtained. In FIG. 7, the corresponding gradient image is shown with grey tones indicating the value of the calculated differences.

As visible in FIG. 7, the linear gradients show minima 72.1, 72.2 and maxima 73.1, 73.2 at the positions of the side edges of the parallel lines 62.1, 62.2, 62.3. These minima 72.1, 72.2 and maxima 73.1, 73.2 are edge peaks in the image. The relative distances between these edge peaks correspond to the widths of the parallel lines 62.1, 62.2, 62.3 of the exception marking 60 and are thus lengths 90.1, 90.2, 90.3 provided by the exception marking 60. Since there are three parallel lines 62.1, 62.2, 62.3, three lengths 90.1, 90.2, 90.3 are provided by the exception marking 60. These three lengths 90.1, 90.2, 90.3 result in two characteristic length ratios of the exception marking 60, while the sequence of the three lengths 90.1, 90.2, 90.3 results in the sequence of lengths along the reference line provided by the exception marking 60. For detecting the optical signature of the exception marking 60, the three characteristic lengths of the exception marking 60 are detected in the normalized areal image. Subsequently, for the second and the third of the three lengths 90.2, 90.3, the respective ratio with the first one of the three lengths 90.1 is calculated. If both ratios are within an error range of plus/minus 10% of the values of the respective ratio known for the exception marking 60, the optical signature of the exception marking 60 is detected and assigned to the person 200 detected in the image shown in FIG. 5. With this criterion for determining whether the optical signature of the exception marking 60 is detected or not, the sequence of the three lengths 90.1, 90.2, 90.3 along the reference line provided by the exception marking 60 is automatically considered, too. In other variants, a different way without considering the sequence of the three lengths 90.1, 90.2, 90.3 is used for detecting the optical signature of the exception marking 60. In an example of such another variant, the ratio of each possible pair of detected lengths is calculated in order to obtain a set of detected ratios. Then, ratios of the obtained set of ratios are compared with the at least one characteristic length ratio of the exception marking

60. In case each one of the at least one characteristic length ratio of the exception marking 60 is present in the set of ratios within an error range of plus/minus 10% of the values of the respective characteristic length ratio known from the exception marking 60, the optical signature of the exception marking 60 is detected and assigned to the person 200 detected in the image shown in FIG. 5.

In variants, the error range for detection of the optical signature can be increased or decreased as compared to the value of 10%. Furthermore, in variants, the exception marking can comprise more than three parallel lines. In case the exception marking provides four parallel lines, for example, there are three characteristic length ratios.

In summary, it is to be noted that a method and an arrangement pertaining to the technical field initially mentioned is created, that enable efficiently and inexpensively to determine a group of persons to be considered staying in an observation region by considering exception markings for other persons who are not to be considered.

The invention claimed is:

1. A method for determining a group of persons to be considered staying in an observation region by considering exception markings for other persons, wherein said group of persons to be considered is a group of the persons staying in said observation region excluding the other persons who stay in said observation region and carry one of said exception markings, characterised in that in said method,
   a) at least one image is recorded of said observation region,
   b) in said at least one image, the persons staying in said observation region and optical signatures of said exception markings are detected, wherein the detected optical signatures are assigned to detected persons, and
   c) a detected group of the detected persons in said observation region is determined excluding the detected persons with assigned detected optical signature, wherein said detected group is said group of said persons to be considered, wherein said exception markings are graphic pattern with at least one characteristic length ratio.

2. The method according to claim 1, wherein a total number of the detected persons in said observation region is determined excluding the detected persons with assigned detected optical signature, wherein said total number is a number of said persons in said group of persons to be considered.

3. The method according to claim 1, wherein for each exception marking, each one of said at least one characteristic length ratio is a ratio of two lengths and thus of a pair of lengths provided by the respective graphic pattern.

4. The method according to claim 1, wherein all of said exception markings are of a same exception marking type, wherein said exception marking type is defined by exception marking type values of the at least one characteristic length ratio provided by the exception markings of said exception marking type.

5. The method according to claim 1, wherein said exception markings are of at least two different exception marking types, wherein each of said exception marking types is defined by exception marking type values of the at least one characteristic length ratio provided by the exception markings of the respective exception marking type.

6. The method according to claim 1, wherein said exception markings are graphic pattern with at least two characteristic length ratios.

7. The method according to claim 1, wherein each of said exception markings is a graphic pattern located on a surface of a marking carrier.

8. The method according to claim 3, wherein for each pair of lengths resulting in one of said at least one characteristic length ratio, said lengths are measured along a reference line on said surface of said marking carrier.

9. The method according to claim 1, wherein said graphic pattern of said exception markings are each a pattern of parallel lines.

10. The method according to claim 9, wherein for each of said graphic pattern, each one of said at least one characteristic length ratio is a ratio of two lengths measured perpendicular to said parallel lines of the respective graphic pattern.

11. The method according to claim 3, wherein in said at least one image, edge peaks are determined and relative distances between said edge peaks are determined being the lengths for determining said at least one characteristic length ratio.

12. The method according to claim 11, wherein in order to determine said edge peaks in said at least one image, linear gradients are calculated from said at least one image and said linear gradients are examined for minima and maxima, said minima and maxima, respectively, being said edge peaks.

13. The method according to claim 1, wherein the other persons who stay in said observation region and carry one of said exception markings carry their exception marking on their upper body.

14. The method according to claim 1, wherein in the method, a video sequence of the observation region comprising a multiplicity of images is recorded.

15. The method according to claim 14, wherein in the method, the persons staying in said observation region are tracked over two or more images of said multiplicity of images.

16. An arrangement for determining a group of persons to be considered staying in an observation region by considering exception markings for other persons, wherein said group of persons to be considered is a group of the persons staying in said observation region excluding the other persons who stay in said observation region and carry one of said exception markings, wherein the arrangement includes
   a) at least one image recording device for recording at least one image of said observation region,
   b) a person detection module for detecting in said at least one image the persons staying in said observation region,
   c) an exception marking detection module for detecting optical signatures of said exception markings, and
   d) an assignment module for assigning the detected optical signatures to detected persons, and
   e) a group detection module for determining a detected group of the detected persons in said observation region excluding the detected persons with assigned detected optical signature, wherein said detected group is said group of said persons to be considered, wherein said exception markings are graphic pattern with at least one characteristic length ratio.

17. The method according to claim 1, wherein said exception markings are graphic pattern with at least three characteristic length ratios.

18. The method according to claim 1, wherein the other persons who stay in said observation region and carry one of said exception markings carry their exception marking on their chest.

* * * * *